Nov. 27, 1928.
G. FORNACA
1,693,111
WHEEL SUSPENSION MEANS FOR MOTOR VEHICLES
Filed July 13, 1927
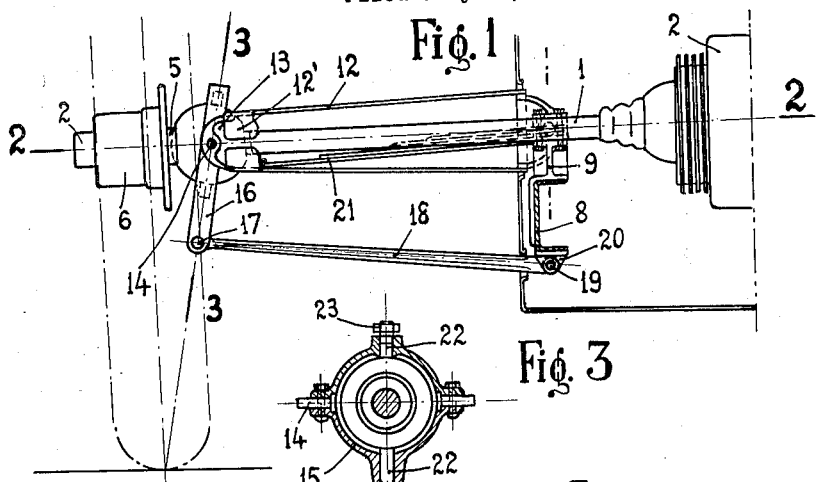
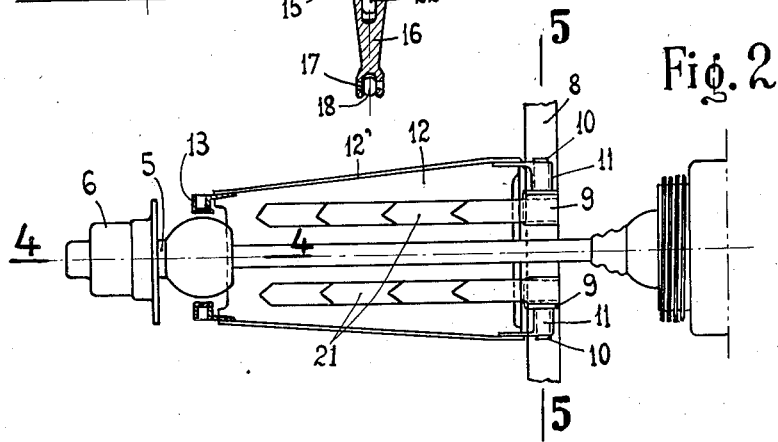
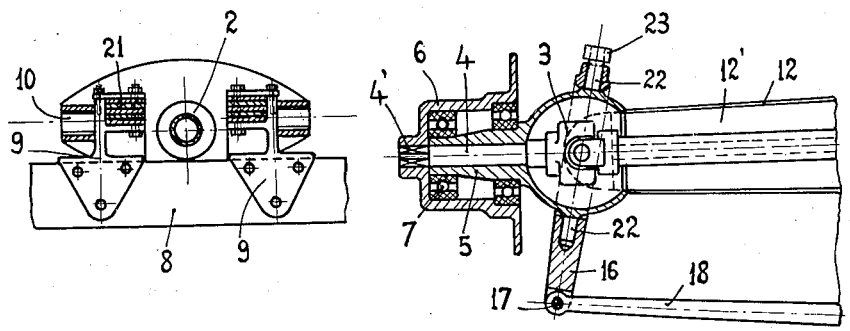
Inventor:
Guido Fornaca
By Emil Bönnelycke
Attorney Patented Nov. 27, 1928.

1,693,111

UNITED STATES PATENT OFFICE.

GUIDO FORNACA, OF TURIN, ITALY.

WHEEL-SUSPENSION MEANS FOR MOTOR VEHICLES.

Application filed July 13, 1927, Serial No. 205,458, and in Italy July 16, 1926.

The present invention relates to means for independent suspension or mounting of vehicle wheels and more particularly of steering and driving wheels on motor vehicles.

One object of this invention is to provide a wheel suspension in which each wheel hub is supported by a carrier pivoted on members arranged transverse to the vehicle frame and pivotally connected with said frame to provide a deformable four-bar gear comprising the wheel frame, transverse members and carrier, said carrier acting as a link in such gear, while resilient means are provided for damping the oscillations of said gear and wheel carrier.

Another object of the invention is to provide a suspension of the above described kind for steering and driving wheels in which the wheel hub is supported by a swivel member mounted for steering movement in said carrier and is driven by a shaft having a flexible joint to provide for the free oscillation of the wheel with respect to the vehicle frame.

Still another object is to provide a suspension of the kind above referred to in which the transverse members provide an oscillating casing in which are enclosed and protected wheel-driving means and oscillation-damping means.

A further object is a construction of the above described character in which the aforesaid casing has a shape reducing its resistance to air during the vehicle travel and enabling it to withstand stresses acting on the wheels in a direction parallel with the longitudinal axis of the vehicle frame.

In the annexed drawing:

Figure 1 is a fragmentary front elevation of a construction of the improved wheel suspension, Figure 2 is a plan view thereof with parts in section on line 2—2 of Fig. 1, Figure 3 is a fragmentary section on line 3—3 of Fig. 1, Figure 4 is a fragmentary section on line 4—4 of Fig. 2 on an enlarged scale and Figure 5 is a fragmentary vertical section on line 5—5 of Figure 2.

In the embodiment illustrated, 1 is the driving axle for a wheel shown in dotted lines, said axle being driven by a differential gear enclosed in casing 2, as conventional, through the intermediary of a flexible joint not shown.

The end of said axle 1 is connected by means of a flexible joint 3 with a stub shaft 4 journalled in a swivel member 5 which is supported in the hereinafter described manner and in turn carries a wheel hub 6 rotatable thereon by means of ball bearings 7; said stub shaft 4 imparts the drive to the wheel hub by means of its square portion 4' engaged in a bore of similar shape in the wheel hub 6.

On the vehicle frame 8 are fastened brackets 9 each carrying a trunnion 10, and on said trunnions is journalled by collars 11 fastened thereon, a casing comprising elongated plate members 12—12 which have a comparatively large extension in a direction parallel with the longitudinal axis of the vehicle frame and are provided with vertical flanges 12' to define a space intermediate said plate members.

At its outer end said casing is provided with collars 13 in which are journalled trunnions 14 carried by a swivel carrier 15 having a depending arm 16; said arm 16 is pivotally connected by a pin 17 with one end of a rod 18 which has its opposite end pivoted on a pin 19 carried by a bracket 20 which is fastened on the vehicle frame 8 at a suitable distance below said trunnions 10.

Within said casing 12—12 are located leaf springs 21 whose free outer ends bear on the bottom member 12 of said casing while their inner ends are fastened on brackets 9 adjacent trunnions 10.

The said casing 12—12, rod 18 and carrier 15 provide a deformable four-bar gear whose stationary bar or member is provided by the portion of the vehicle frame 8 intermediate trunnions 10 and pin 19, while the carrier 15 provides the link member of said four-bar gear and its vertical oscillations are damped by springs 21 which support the suspended load.

The swivel member 5 carrying the wheel hub 6 is journalled around an axis lying in a plane transverse to the axis of the aligned trunnions 14—14 and intersecting the last named axis, the said swivel member being mounted by means of trunnions 22 providing for steering movement of said swivel member 5, the hub 6 and the wheel carried thereby; the steering control of said swivel 5 is made by means of an arm 23 solid therewith and actuated by any conventional steering gear, not shown.

As illustrated the driving axle 1 is located within the casing 12—12 which has an elongated cross section and preferably an elliptical cross section to reduce the resistance to its penetration in air when the vehicle is running.

Furthermore, owing to the substantial width of the parts 12—12 providing said casing and to the distance between trunnions 10 connecting the same with the vehicle frame, said casing is in condition to satisfactorily withstand the longitudinal stresses acting on the vehicle wheels.

What I claim as my invention and desire to secure by United States Letters Patent is:—

1. A mounting for vehicle wheels comprising a hollow member extending transversely to the vehicle frame and pivoted thereon for vertical oscillation, said hollow member having a cross section which is vertically depressed and elongated in a direction parallel to the axis of the vehicle frame, a rigid member extending transversely to said vehicle frame at a distance below said hollow member and mounted on said frame for vertical oscillation, a member linking said hollow and rigid members, a wheel hub, means on said link members, a wheel hub, and member for supporting said wheel hub, and resilient suspension means in said hollow member to damp oscillations of said interconnected parts and wheel with respect to the vehicle frame.

2. A mounting for vehicle wheels comprising a hollow member extending transversely to the vehicle frame and pivoted thereon for vertical oscillation, a rigid member extending transversely to said vehicle frame at a distance below said hollow member and mounted on said frame for vertical oscillation, a member linking said hollow and rigid members, a wheel hub, means on said link member for supporting said wheel hub, means extending through said hollow member to drive said wheel hub and wheel, and leaf springs fastened on the vehicle frame and enclosed in said hollow member, said leaf springs acting on said hollow member to damp oscillations of said interconnected parts and wheel with respect to the vehicle frame.

3. A mounting for vehicle wheels comprising a hollow member extending transversely to the vehicle frame and pivoted thereon for vertical oscillation, said hollow member having a cross section which is vertically depressed and elongated in the direction parallel with the axis of the vehicle frame, a rigid member extending transversely to said vehicle frame at a distance below said hollow member and mounted on said frame for vertical oscillation, a member linking said hollow and rigid members, a wheel hub, means on said link member for supporting said wheel hub, means extending through said hollow member to drive said wheel hub and wheel, and resilient suspension means in said hollow member to damp the oscillations of said interconnected parts with respect to the vehicle frame.

4. A mounting for vehicle wheels comprising a hollow member extending transversely to said vehicle frame and pivoted thereon for vertical oscillation, a rigid member extending transversely to said vehicle frame at a distance below said hollow member and mounted on said frame for vertical oscillation, a member linking said hollow and rigid members, a swivel member mounted on said link member for steering movement, a wheel hub on said swivel member, and leaf springs fastened on the vehicle frame and enclosed in said hollow member, said leaf springs acting on said hollow member to damp oscillations of said interconnected parts with respect to said vehicle frame.

5. A mounting for vehicle wheels comprising a hollow member extending transversely to the vehicle frame and pivoted thereon for vertical oscillation, a rigid member extending transversely to said vehicle frame at a distance below said hollow member and mounted on said frame for vertical oscillation, a member linking said hollow and rigid members, a swivel member mounted on said link member for steering motion, a wheel hub on said swivel member, means including an axle for driving said wheel hub, said axle extending through said hollow member, and leaf springs fastened on the vehicle frame and extending through said hollow member, said leaf springs acting on said hollow member to damp the oscillations of said interconnected parts with respect to the vehicle frame.

6. A mounting for vehicle wheels comprising a hollow member extending transversely to the vehicle frame and pivoted thereon for vertical oscillation, said hollow member having a cross section which is vertically depressed and elongated in a direction parallel to the axis of the vehicle frame, a rigid member extending transversely to said vehicle frame at a distance below said hollow member and mounted on said frame for vertical oscillation, a member linking said hollow and rigid members, a swivel member mounted on said link member for steering movement, a wheel hub on said swivel member, means including an axle for driving said wheel hub, said axle extending through said hollow member, and suspension means in said hollow member to damp the oscillations of said interconnected parts and wheel with respect to the vehicle frame.

7. A mounting for vehicle wheels comprising a hollow member extending transversely to the vehicle frame and pivoted thereon for vertical oscillation, said hollow member having a cross section which is vertically depressed and elongated in a direction parallel to the axis of the vehicle frame, a rigid member extending transversely to said vehicle frame at a distance below said hollow member and mounted on said frame for vertical oscillation, a member linking said hollow and rigid members, a bored swivel member mounted on said link member for steering movement, a wheel hub on said swivel member, a stub shaft rotatable in said bored swivel member and driving said hub, a hollow cover extending from said swivel member, a driving axle enclosed in said hollow member, a flexible joint coupling said driving axle and stub shaft and enclosed in said hollow cover, and a leaf spring fastened on the vehicle frame and enclosed in said hollow member, said leaf spring acting on said hollow member to damp the oscillations of said interconnected parts with respect to the vehicle frame.

In testimony whereof I affix my signature.

GUIDO FORNACA.